(12) United States Patent
Lee

(10) Patent No.: US 11,614,833 B2
(45) Date of Patent: Mar. 28, 2023

(54) DISPLAY DEVICE AND METHOD OF DRIVING THE SAME

(71) Applicant: SAMSUNG DISPLAY CO., LTD., Yongin-si (KR)

(72) Inventor: Soon Gyu Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/544,101

(22) Filed: Dec. 7, 2021

(65) Prior Publication Data

US 2022/0317854 A1 Oct. 6, 2022

(30) Foreign Application Priority Data

Apr. 2, 2021 (KR) .................. 10-2021-0043559

(51) Int. Cl.
*G06F 3/041* (2006.01)
*G06F 3/044* (2006.01)

(52) U.S. Cl.
CPC ........ *G06F 3/04184* (2019.05); *G06F 3/0446* (2019.05)

(58) Field of Classification Search
CPC ............................ G06F 3/04184; G06F 3/0446
See application file for complete search history.

(56) References Cited

U.S. PATENT DOCUMENTS

| | | | |
|---|---|---|---|
| 9,710,114 B2 | 7/2017 | Lee | |
| 10,254,891 B2* | 4/2019 | Noh | G06F 3/0445 |
| 11,204,667 B1* | 12/2021 | Jordan | G06F 3/0446 |
| 2013/0342478 A1* | 12/2013 | Bae | G06F 3/0443 |
| | | | 345/173 |
| 2014/0071066 A1* | 3/2014 | Lee | G06F 3/04166 |
| | | | 345/173 |
| 2014/0132560 A1* | 5/2014 | Huang | G06F 3/041 |
| | | | 345/174 |
| 2014/0292709 A1* | 10/2014 | Mizuhashi | G06F 3/0446 |
| | | | 345/174 |
| 2015/0370410 A1* | 12/2015 | Sauer | G06F 3/04166 |
| | | | 345/173 |
| 2016/0077617 A1* | 3/2016 | Lee | G06F 3/04184 |
| | | | 345/173 |
| 2017/0108991 A1* | 4/2017 | Noh | G06F 3/0446 |
| 2017/0131829 A1* | 5/2017 | Takahashi | G06F 3/04182 |

FOREIGN PATENT DOCUMENTS

| | | |
|---|---|---|
| KR | 10-2017-0045432 | 4/2017 |
| KR | 10-1886255 | 8/2018 |

* cited by examiner

*Primary Examiner* — Ibrahim A Khan
(74) *Attorney, Agent, or Firm* — F. Chau & Associates, LLC

(57) ABSTRACT

A display device includes a display panel for displaying an image, a touch sensor operating in one of a normal sensing mode in which a surface touch is recognized and a proximity sensing mode in which a hovering touch is recognized, and a touch driver for supplying a touch driving signal including a plurality of driving pulses to the touch sensor during a sensing period, and receiving a touch sensing signal from the touch sensor. In the proximity sensing mode, the touch driver sets a noise period including a first noise period and a second noise period in the sensing period, and decreases a number of times the driving pulses are supplied during the second noise period when it is determined that a variation of the image is greater than a predetermined reference variation.

14 Claims, 15 Drawing Sheets

DISPLAY DEVICE AND METHOD OF DRIVING THE SAME

CROSS-REFERENCE TO RELATED APPLICATION

This non-provisional U.S. patent application claims priority under 35 U.S.C. § 119 to Korean Patent Application No. 10-2021-0043559, filed in the Korean Intellectual Property Office on Apr. 2, 2021, the entire disclosure of which is incorporated by reference in its entirety herein.

TECHNICAL FIELD

The present disclosure generally relates to a display device and a method of driving the same.

DISCUSSION OF RELATED ART

Electronic devices including portable terminals, digital cameras, notebook computers, and navigation systems including a display device to provide images to users. The display device includes a display panel for generating and displaying an image and an input device.

The input device may include a touch sensor for recognizing a touch input. The touch sensor may be used as a substitute for a keypad.

Examples of touch sensors include a resistive type, an optical type, and a capacitive type. A capacitive type touch sensor calculates a touch position by sensing a change in capacitance formed in a plurality of sensing electrodes when a finger of a user or a stylus pen is in contact with a sensor unit including the plurality of sensing electrodes. Specifically, the touch sensor may calculate a touch position by sampling a plurality of touch sensing signals sensed during a predetermined sensing period.

However, noise generated by various driving signals supplied to a display panel including the capacitive type touch sensor may reduce sensing accuracy.

SUMMARY

At least one embodiment provides a display device with increased touch recognition sensitivity by minimizing the influence of noise caused by a parasitic capacitance generated between a touch sensor and a display panel, and a method of driving the display device.

In accordance with an embodiment of the present disclosure, there is provided a display device including: a display panel, a touch sensor, and a touch driver. The display panel is configured to display an image, based on image data. The touch sensor is configured to operate in one of a normal sensing mode in which a surface touch is recognized and a proximity sensing mode in which a hovering touch is recognized. The touch driver is configured to supply a touch driving signal including a plurality of driving pulses to the touch sensor during a sensing period, and receive a touch sensing signal from the touch sensor.

In the proximity sensing mode, the touch driver sets a noise period including a first noise period and a second noise period in the sensing period, when it is determined that a variation of the image is greater than a predetermined reference variation, and decreases a number of times the driving pulses are supplied during the second noise period.

In an embodiment, the touch driver does not supply the driving pulses or decreases the number of times the driving pulses are supplied, during the first noise period.

In an embodiment, the display device includes a driver to output one frame of the image data during a vertical period, and output a horizontal line unit of the one frame during a horizontal period.

In an embodiment, the noise period includes a plurality of frame periods, and the second noise period is longer than the first noise period.

In an embodiment, in each of horizontal periods of the second noise period, the touch driver does not supply the driving pulses during a first period, but supplies the driving pulses during a second period consecutive to the first period.

In an embodiment, in each of horizontal periods of the first noise period, the touch driver does not supply the driving pulses during a third period, but supplies the driving pulses during a fourth period consecutive to the third period.

A mode of the touch sensor may be changed from the normal sensing mode to the proximity sensing mode, when the display device enters into a call mode in which a call application is executed.

In the call mode, the touch driver may turn off the display panel through the proximity sensing mode, when it is determined that the display panel is within a predetermined distance of a part of body of a user.

The variation of the image may be determined from a luminance variation of the display panel or a load value variation of the image data.

The touch driver may determine whether a variation of capacitance occurring between the display panel and the touch sensor is greater than the reference variation by comparing the variation of capacitance occurring between the display panel and the touch sensor with the reference variation, corresponding to the luminance variation or the load value variation.

In accordance with an embodiment of the present disclosure, there is provided a display device including: a display panel, a touch sensor, and a touch driver. The display panel is configured to display an image. The touch sensor is configured to operate in one of a normal sensing mode in which a surface touch is recognized and a proximity sensing mode in which a hovering touch is recognized. The touch driver is configured to supply a touch driving signal to the touch driver including driving pulses having a rising period and a falling period during a sensing period, and receive a touch sensing signal from the touch sensor.

In the proximity sensing mode, the touch driver sets a noise period in the sensing period, when it is determined that a variation of the image is greater than a predetermined reference variation. During the noise period, the touch driver changes a ratio of a width of a rising period of each of the driving pulses and a width of a falling period of each of the driving pulses, and change amplitudes of the rising period and the falling period of each of the driving pulses.

The touch driver may set the width of the falling period to be greater than that of the rising period.

The touch driver may set a magnitude of the amplitude of the falling period to be greater than that of the amplitude of the rising period.

The touch driver may set a maximum value of the amplitude of the rising period to be a positive value, and set a minimum value of the amplitude of the falling period to be a negative value.

In an embodiment, the noise period includes a first noise period and a second noise period, and the second noise period is longer than the first noise period.

In an embodiment, the touch driver does not supply the driving pulses during the first noise period.

The mode of the sensor unit may be changed from the normal sensing mode to the proximity sensing mode, when the display device enters into a call mode in which a call application is executed.

In the call mode, the touch driver may turn off the display panel through the proximity sensing mode, when it is determined that the display panel is within a predetermined distance of a part of a body of a user.

The variation of the image may be determined from a luminance variation of the display panel or a load value variation of the image data.

The touch driver may determine whether a variation of capacitance occurring between the display panel and the touch sensor is greater than the reference variation by comparing the variation of capacitance occurring between the display panel and the touch sensor with the reference variation, corresponding to the luminance variation or the load value variation.

In accordance with an embodiment of the present disclosure, there is provided a method of driving a display device including a display panel for displaying an image, a touch sensor operating in one of a normal sensing mode in which a surface touch is recognized and a proximity sensing mode in which a hovering touch is recognized, and a touch driver for supplying a touch driving signal including a plurality of driving pulses to the sensor unit during a sensing period. The method includes: determining whether the display device has entered into a call mode in which a call application is executed; and changing a mode of the touch sensor from the normal sensing mode to the proximity sensing mode, when the display device enters into the call mode. In the proximity sensing mode, the method further includes: determining whether a variation of the image is greater than a predetermined reference variation; setting a noise period including a first noise period and a second noise period in the sensing period, when the variation of the image is greater than the predetermine reference variation; and the touch driver decreasing a number of times the touch driving signal is supplied during the second noise period.

The method may include the touch driver not supplying the driving pulses or decreasing a number of times the driving pulses are supplied, during the first noise period in the proximity sensing mode.

The variation of the image may be determined from a luminance variation of the display panel or a load value variation of the image data.

The determining of whether the variation of the image is greater than the predetermined reference variation may include determining whether a variation of capacitance occurring between the display panel and the touch sensor is greater than the reference variation by comparing the variation of capacitance occurring between the display panel and the touch sensor with the reference variation, corresponding to the luminance variation or the load value variation.

In accordance with an embodiment of the present disclosure, there is provided a method of driving a display device including a display panel for displaying an image, a touch sensor operating in one of a normal sensing mode in which a surface touch is recognized and a proximity sensing mode in which a hovering touch is recognized, and a touch driver for supplying a touch driving signal to the touch sensor including driving pulses having a rising period and a falling period, during a sensing period. The method includes: determining whether the display device has entered into a call mode in which a call application is executed; and changing a mode of the touch sensor from the normal sensing mode to the proximity sensing mode, when the display device enters into the call mode. In the proximity sensing mode, the method further includes: determining whether a variation of the image is greater than a predetermined reference variation; setting a noise period in the sensing period, when the variation of the image is greater than the predetermined reference variation; and the touch driver changing a ratio of a width of a rising period of each of the driving pulses and a width of a falling period of each of the driving pulses and changing amplitudes of the rising period and the falling period of each of the driving pulses, during the noise period.

The changing may include setting the width of the falling period greater than that of the rising period, and setting a magnitude of the amplitude of the falling period greater than that of the amplitude of the rising period.

The magnitude of the amplitude of the falling period may be greater than that of the amplitude of the rising period.

In an embodiment, the noise period includes a first noise period and a second noise period, and the second noise period is longer than the first noise period.

The changing may include the touch driver not supplying the driving pulses during the first noise period.

The variation of the image may be determined from a luminance variation of the display panel or a load value variation of image data of the image.

The determining of whether the variation of the image is greater than the predetermined reference variation may include determining whether a variation of capacitance occurring between the display panel and the touch sensor is greater than the reference variation by comparing the variation of capacitance occurring between the display panel and the touch sensor with the reference variation, corresponding to the luminance variation or the load value variation.

BRIEF DESCRIPTION OF THE DRAWINGS

The disclosure will become more apparent by describing in further detail embodiments thereof with reference to the accompanying drawings, in which.

DETAILED DESCRIPTION

Figure 1A:
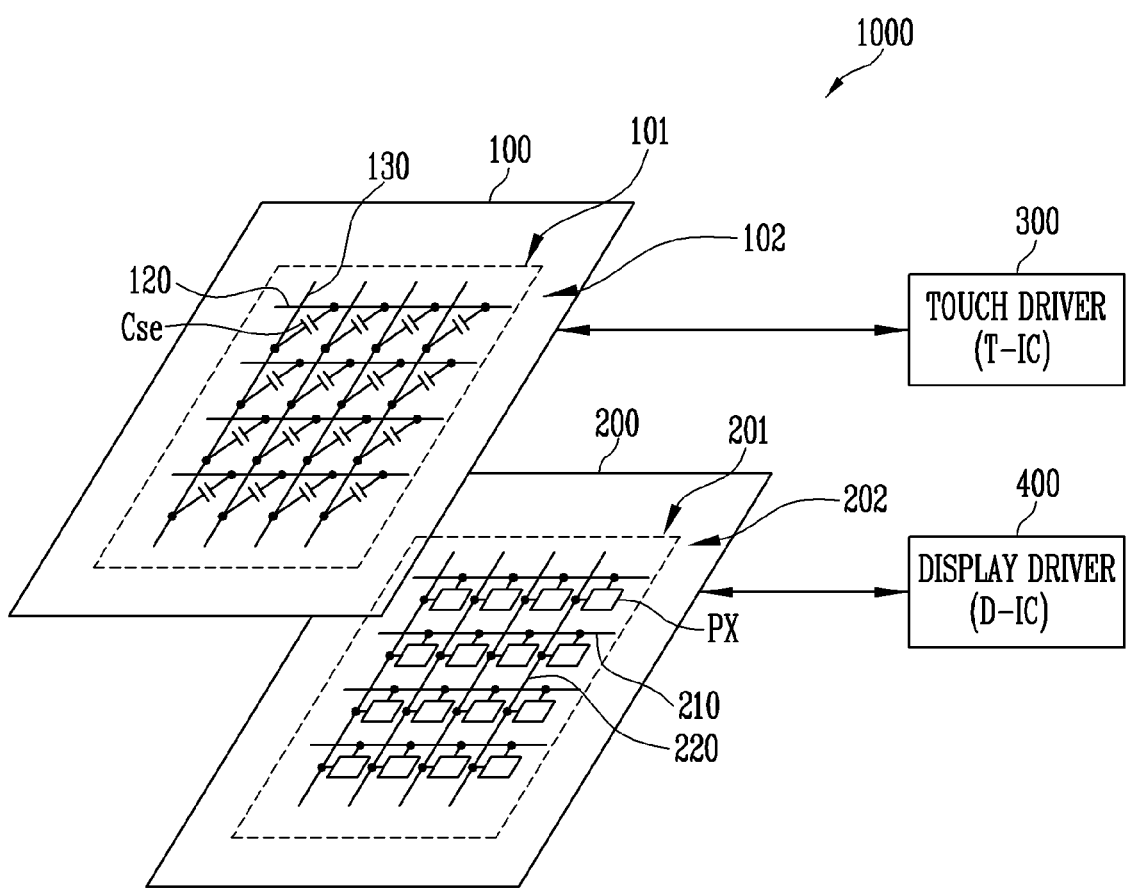
FIG. 1A schematically illustrates a display device in accordance with an embodiment of the present disclosure.

Hereinafter, exemplary embodiments are described in detail with reference to the accompanying drawings so that one of ordinary skill in the art may practice the present disclosure. The present disclosure may be implemented in various different forms and is not limited to the exemplary embodiments described in the present specification.

Parts not relevant to the description may be omitted to more clearly describe the present disclosure. The same or similar elements will be designated by the same reference numerals throughout the specification. Therefore, the same reference numerals may be used in different drawings to identify the same or similar elements.

In addition, while certain sizes and thicknesses of each component are illustrated in the drawings, the present disclosure is not necessarily limited thereto.

In description, the expression "equal" may mean "substantially equal." That is, this may mean equality to a degree to which those skilled in the art can understand the equality. Other expressions may be expressions in which "substantially' is omitted.

Figure 1B:
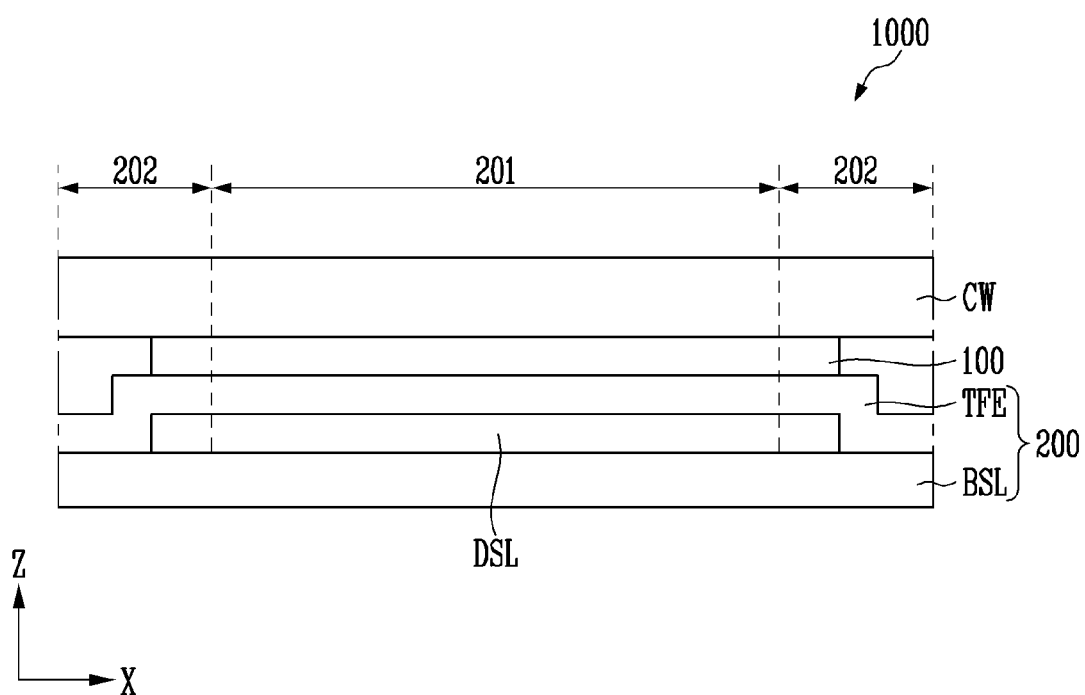
FIG. 1B is a schematic partial sectional view of the display device shown in FIG. 1A.
Figure 2:
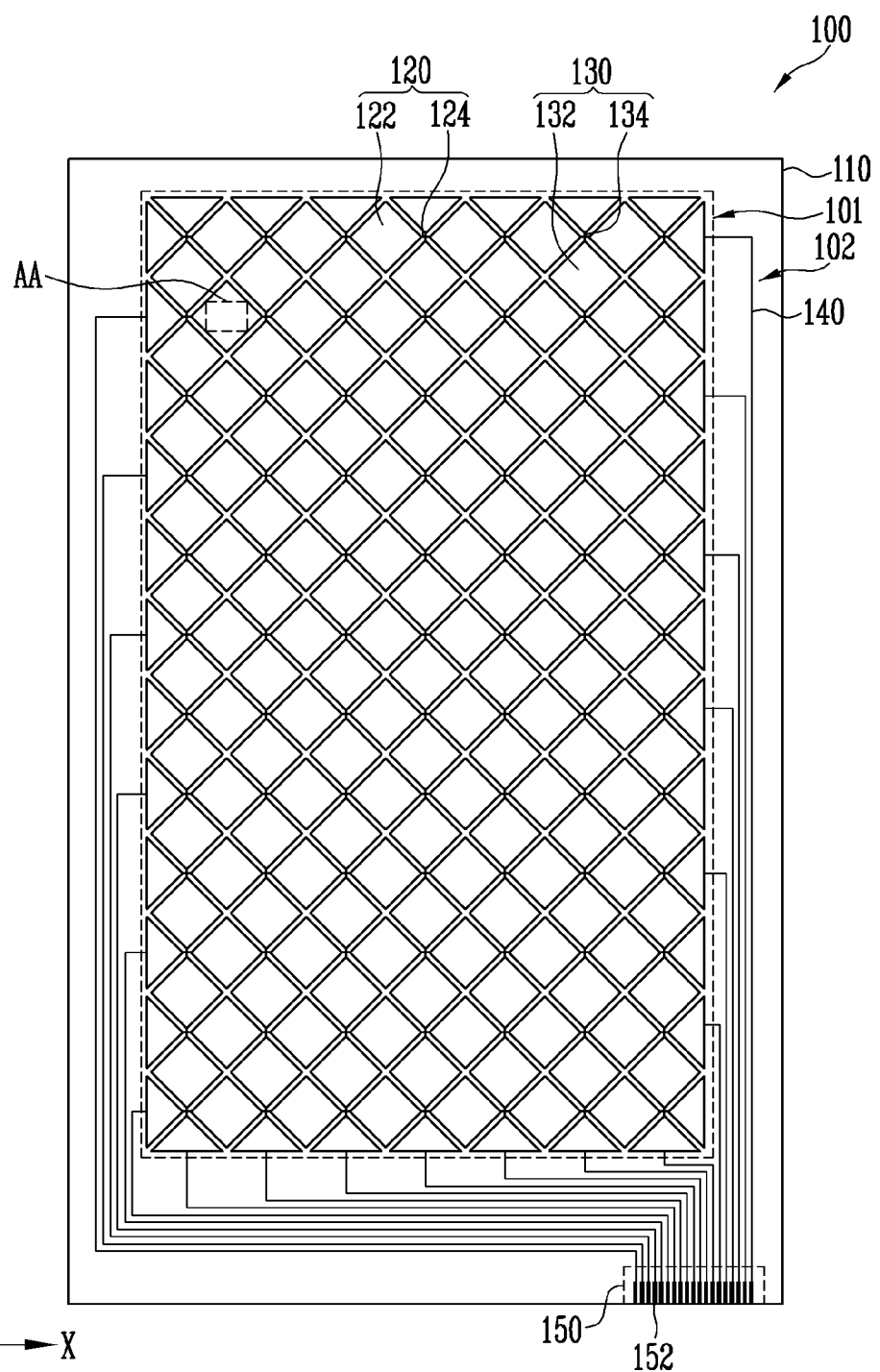
FIG. 2 illustrates a sensor unit of a touch sensor in accordance with an embodiment of the present disclosure.
Figure 3A:
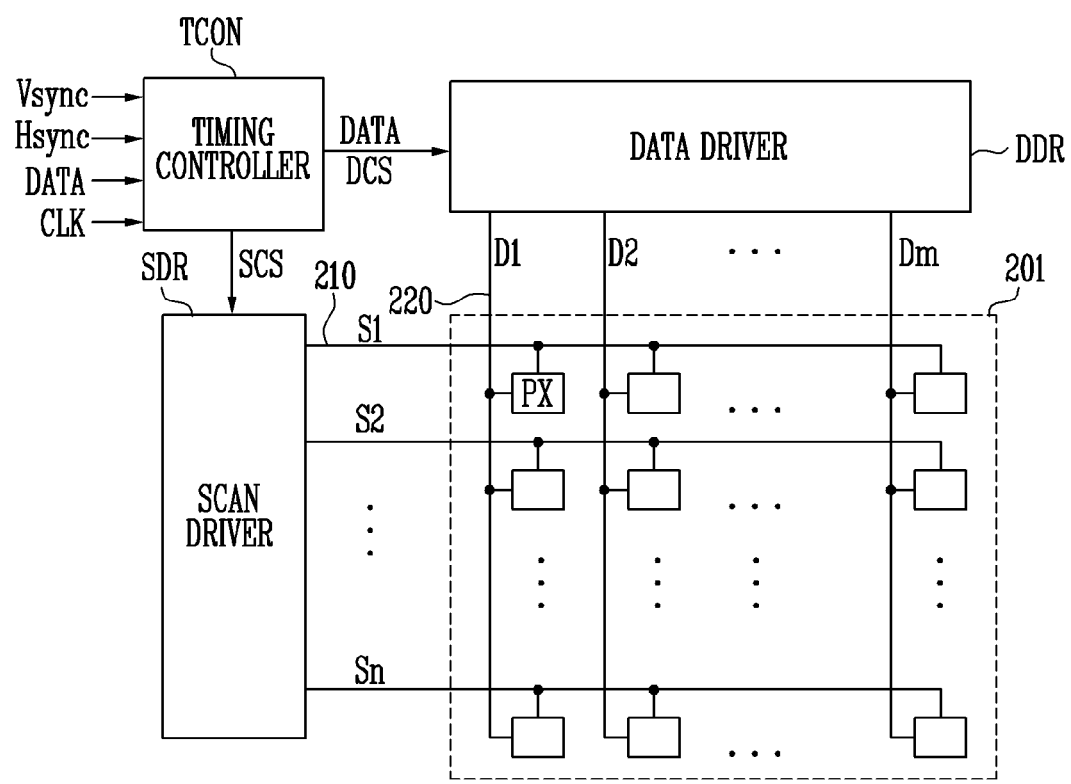
FIG. 3A is a block diagram illustrating a display panel and a display driver in accordance with an embodiment of the present disclosure.
Figure 3B:
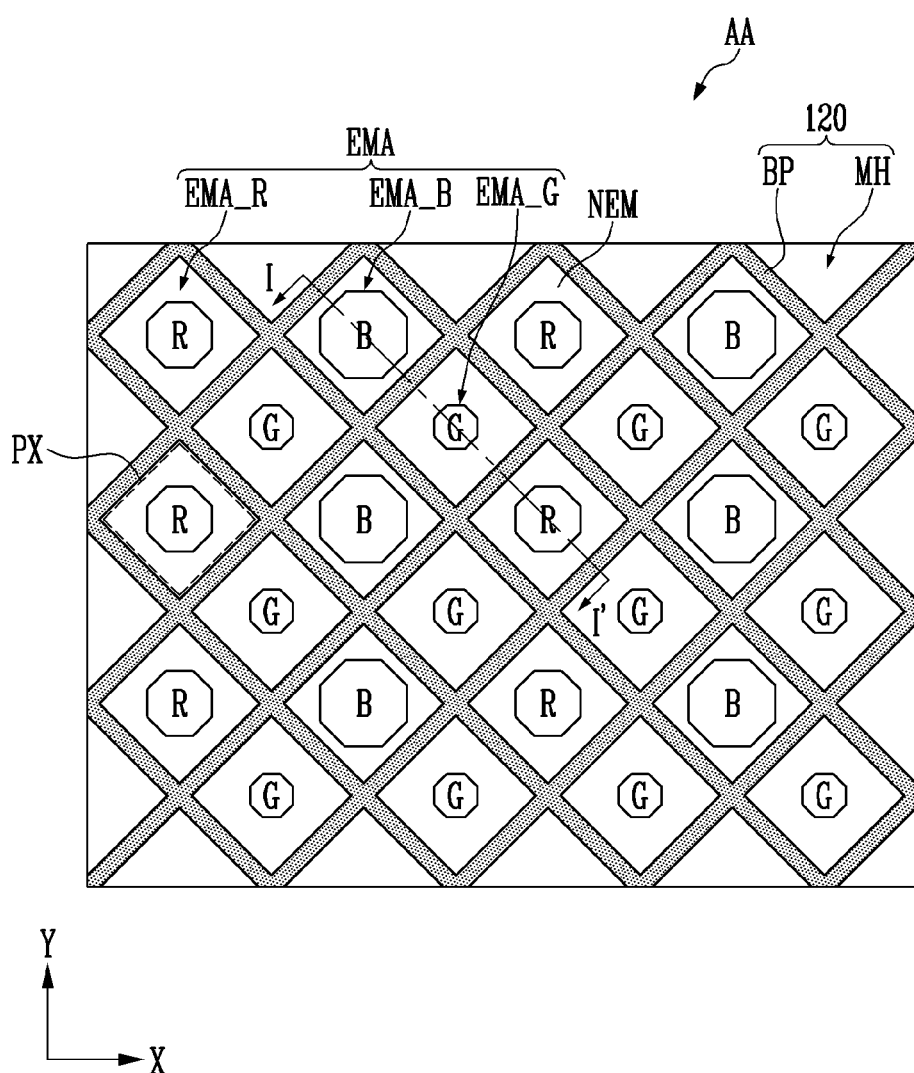
FIG. 3B is an enlarged view of area AA shown in FIG. 2, schematically illustrating an arrangement relationship of a pixel of the display panel and a touch sensor unit in accordance with an embodiment of the present disclosure.
Figure 3C:
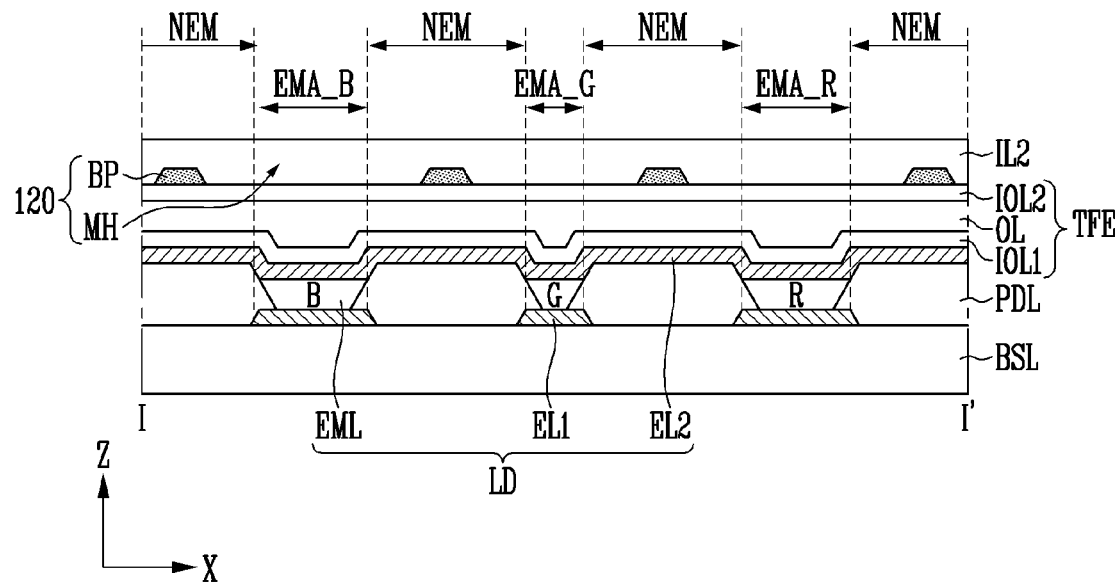
FIG. 3C is a sectional view taken along line I-I' shown in FIG. 3B.

FIG. 1A schematically illustrates a display device in accordance with an embodiment of the present disclosure. FIG. 1B is a schematic partial sectional view of the display device shown in FIG. 1A. FIG. 2 illustrates a sensor unit of a touch sensor in accordance with an embodiment of the present disclosure. FIG. 3A is a block diagram illustrating a display panel and a display driver in accordance with an embodiment of the present disclosure. FIG. 3B is an enlarged view of area AA shown in FIG. 2, schematically illustrating an arrangement relationship of a pixel of the display panel and a touch sensor unit in accordance with an embodiment of the present disclosure. FIG. 3C is a sectional view taken along line I-I' shown in FIG. 3B.

Referring to FIG. 1A, the display device 1000 in accordance with the embodiment of the present disclosure includes a sensor unit 100 (e.g., a touch sensor), a display panel 200, a touch driver 300 (e.g., driver circuit), and a display driver 400 (e.g., driver circuit). The sensor unit 100 and the touch driver 300 may constitute a touch sensor.

In accordance with an embodiment of the present disclosure, the display device 1000 may be applied to a portable terminal. Although not separately shown, the display device 1000 may be disposed in a bracket, case or the like together with an electronic module, a camera module, and a power module, which are mounted on a main board, to constitute the portable terminal. However, the display device 1000 is not limited thereto. For example, the display device 1000 may be applied to medium-/small-sized electronic devices such as tablet PCs, vehicle navigation systems, game consoles, and smart watches, including large-sized electronic devices such as televisions and monitors.

While the sensor unit 100 and the display panel 200 are illustrated as being separated from each other in FIG. 1A, the present disclosure is not limited thereto. For example, the sensor unit 100 and the display panel 200 may be integrally manufactured.

In an embodiment, the sensor unit 100 may be provided on at least one surface of the display panel 200. For example, the sensor unit 100 may be disposed on one surface (e.g., an upper surface) in a direction in which an image is displayed between both surfaces of the display panel 200. In an embodiment, the sensor unit 100 may be formed directly on at least one surface between both the surfaces of the display panel 200 or be formed inside of the display panel 200. For example, the sensor unit 100 may be formed directly on an outer surface of an upper substrate or a lower substrate of the display panel (e.g., an upper surface of the upper substrate or a lower surface of the lower substrate), or be formed directly on an inner surface of the upper substrate or the lower substrate (e.g., a lower surface of the upper substrate or an upper surface of the lower substrate).

The sensor unit 100 includes a touch active area 101 for sensing a touch input and a touch non-active area 102 disposed outside of the touch active area 101. In an embodiments, the touch active area 101 is disposed to correspond to a display area 201 of the display panel 200. In an embodiment, touches are not sensed by the touch non-active area 102.

In an embodiment, at least one area of the sensor unit 100 is disposed to overlap with the display panel 200. For example, at least one area, e.g., the touch active area 101 of the sensor unit 100 may be disposed on one area, e.g., the display area 201 of the display panel 200. In an embodiment, at least one electrode, e.g., a first electrode 120 and a second electrode 130, which are used to detect a touch input, are disposed in the touch active area 101. That is, the first electrode 120 and the second electrode 130 may be provided on the display area 201 of the display panel 200.

Lines for electrically connecting the at least one electrode (e.g., the first and second electrodes 120 and 130) to the touch driver 300, which are provided in the touch active area 101, may be disposed in the touch inactive area 102. In an embodiment, the touch non-active area 102 is disposed to correspond to a non-display area 202 of the display panel 200. In an embodiment, the non-display area 202 does not include any pixels. The touch inactive area 102 may overlap the non-display area 202.

More specifically, the sensor unit 100 may include at least one first electrode 120 and at least one second electrode 130, which are provided in the touch active area 101. In an example, the sensor unit 100 includes a plurality of first electrodes 120 and a plurality of second electrodes 130 intersecting the first electrodes 120. In an embodiment, the first electrodes 120 extend along a first direction, and the second electrodes 130 extend along a second direction intersecting the first direction while being insulated from the first electrodes 120 by an insulating layer (not shown). A capacitance Cse is formed between the first electrodes 120 and the second electrodes 130, particularly, at an intersection portion of the first electrodes 120 and the second electrodes 130. The capacitance Cse is changed when a touch input occurs at a corresponding spot or the periphery thereof. Thus, a change in the capacitance Cse is detected, so that the touch input can be sensed.

While the first electrodes 120 and the second electrodes 130 may be arranged as shown in FIG. 2, the shape, size, and/or arrangement direction of the first electrodes 120 and the second electrodes 130 is not limited thereto.

Referring to FIG. 2, the sensor unit 100 includes a base substrate 110 on which the touch active area 101 and the touch non-active area 102 are defined, first electrodes 120 and second electrodes 130, which are provided in the touch active area 101 on the base substrate 110, and lines 140 and a pad part 150, which are provided in the touch non-active area 102 on the base substrate 110.

The base substrate 110 is a substrate, which is a base of the sensor unit 100, and may be a rigid substrate or a flexible substrate. For example, the base substrate 110 may be a rigid substrate made of glass or tempered glass, or a flexible substrate configured with a thin film made of flexible plastic. In an embodiment, the base substrate 110 is omitted. For example, when the first and second electrodes 120 and 130 are formed directly on at least one substrate constituting the display panel 200, the base substrate 110 for constituting the sensor unit 100 may be replaced with at least one substrate constituting the display panel 200, a thin film encapsulation layer TFE (see FIG. 1B), or the like.

The first electrodes 120 may extend along the first direction, e.g., an X direction. In an embodiments, each of first electrodes 120 disposed on each row include a plurality of sensing cells 122 and first connection parts 124 electrically connecting first sensing cells 122 of each row along the first direction. In some embodiments, the first connection parts 124 may be integrally configured with the first sensing cells 122, or be configured in a bridge-shaped connection pattern. The first electrodes 120 may correspond to a driving electrode (Tx electrode) which is supplied with a touch driving signal for touch driving and/or a sensing electrode (Rx electrode) which outputs a touch sensing signal corresponding to the touch driving signal input to the driving electrode. In an example, when the sensor unit 100 is a mutual capacitive type touch sensor, the first electrodes 120 may be implemented as sensing electrodes.

The second electrodes 130 may extend along the second direction, e.g., a Y direction. In an embodiment, each of second electrodes 130 disposed on each column include a plurality of second sensing cells 132 and second connection parts 134 electrically connecting second sensing cells 132 of each column along the second direction. In some embodiments, the second connection parts 134 may be integrally configured with the second sensing cells 132, or be configured in a bridge-shaped connection pattern. The second electrodes 130 may correspond to a driving electrode which is supplied with a touch driving signal for touch driving and/or a sensing electrode which outputs a touch sensing signal corresponding to the touch driving signal input to the driving electrode. In an example, the sensor unit 100 is a mutual capacitive type touch sensor, the first electrodes 120 may be sensing electrodes, and the second electrodes 130 may be driving electrodes.

The lines 140 connect the first electrodes 120 and the second electrodes 130 to the pad part 150. For example, each line 140 may electrically connect a corresponding first electrode 120 or a corresponding second electrode 130 to a predetermined pad 152 provided in the pad part 150.

The pad part 150 may include a plurality of pads 152 for connecting the first and second electrodes 120 and 130 to an external driving circuit, e.g., the touch driver 300. Signal transmission and/or power supply may be made between the sensor unit 100 and the touch driver 300 through the pad part 150.

Referring back to FIGS. 1A and 1B, the display panel 200 includes the display area 201 and the non-display area 202 disposed outside of the display area 201.

The display panel 200 may include a base substrate BSL, an element layer DSL located on the base substrate BSL, and the thin film encapsulation layer TFE located on the element layer DSL. The thin film encapsulation layer TFE may cover element layer DSL.

The base substrate BSL is a substrate supporting the element layer DSL. In some embodiments, the base substrate BSL may be an insulating substrate made of glass, quartz, ceramic, plastic or the like.

The element layer DSL may be located on the base substrate BSL. In some embodiments, the element layer DSL may include a plurality of pixels PX and a plurality of display signal lines, which are located on the base substrate BSL. Each pixel PX may include a thin film transistor TFT, a capacitor, and a light emitting element. The plurality of signal lines may include a plurality of scan lines 210 for transferring a scan signal to each pixel PX and a plurality of data lines 220 for transferring a data signal to each pixel PX. The pixels PX included in the element layer DSL may be located in the display area 201.

The element layer DSL may further include elements and lines, which are located on the base substrate BSL and are located in the display area 201. In addition, the elements and lines may generate various signals for application to the pixel PX or transfer corresponding signals to the pixels PX.

The thin film encapsulation layer TFE may be located on the element layer DSL. The thin film encapsulation layer TFE may protect the element layer DSL. The thin film encapsulation layer TFE may include a plurality of thin films.

A cover window CW may be disposed on the top of the sensor unit 100. The cover window CW is disposed on the display panel 200, and protects the display panel 200 from an external impact or the like. The cover window CW may be implemented with a film made of a transparent material, e.g., tempered glass or plastic. Although not shown in the drawings, the display device 1000 may further include an optical member.

As shown in FIG. 3A, in accordance with an embodiment of the present disclosure, a plurality of scan lines 210 and a plurality of data lines 220, and a plurality of pixels PX connected to the scan lines 210 and the data lines 220 may be provided in the display area 201. Various driving signals for driving the pixels PX and/or lines for supplying power may be provided in the non-display area 202.

The display panel 200 may be a self-luminescent display panel, but is not limited thereto. The display panel 200 may include a plurality of light emitting elements. For example, the light emitting element may be an organic light emitting diode. Also, the light emitting element may be an inorganic light emitting diode such as a micro light emitting diode (LED) or a quantum dot light emitting diode. Also, the light emitting element may be an element made of a combination of organic and inorganic materials.

Alternatively, the display panel 200 may be a non-self-luminescent display panel such as a Liquid Crystal Display panel (LCD panel), an Electro-Phoretic Display panel (EPD panel), or an Electro-Wetting Display panel (EWD panel). When the display panel 200 is a non-self-luminescent display panel, the display device 1000 may further include a backlight unit for supplying light to the display panel 200.

The touch driver 300 is electrically connected to the sensor unit 100 to transmit/receive a signal used for driving of the sensor unit 100. In an example, the touch driver 300 may detect a touch input by supplying a touch driving signal to the sensor unit 100 and then receive a touch sensing signal corresponding to the touch driving signal from the sensor unit 100. In some embodiments, a driving circuit and a sensing circuit may be integrated in one integrated circuit (IC) to form a touch IC T-IC, but the present disclosure is not limited thereto. In an embodiment, the driving circuit sequentially supplies a touch driving signal to driving electrodes, e.g., the second electrodes 130 of the sensor unit 100. The sensing circuit may receive a touch sensing signal from sensing electrodes, e.g., the first electrodes 120 of the sensor unit 100, and signal-process the received touch sensing signal to detect a touch input.

The display driver 400 is electrically connected to the display panel 200 to supply a signal used for driving of the display panel 200. In accordance with an embodiment, as shown in FIG. 3A, the display driver 400 may include a scan driver SDR which supplies scan signals S1, S2, . . . , and Sn to the scan lines 210, a data driver DDR which supplies data signals D1, D2, . . . , and Dm to the data lines 220, and a timing controller TCON (e.g., a control circuit) which supplies various control signals Vsync, Hsync, and CLK for driving the scan driver SDR and the data driver DDR, and/or image data DATA.

The scan driver SDR may be connected to the scan lines 210, generate scan signals S1, S2, . . . , Sn in response to a scan control signal SCS of the timing controller TCON, and output the generated scan signals S1, S2, . . . , Sn to the scan lines 210. In an embodiment, the scan driver SDR is configured with a plurality of stage circuits, and sequentially supplies the scan signals S1, S2, . . . , Sn to the scan lines 210.

The data driver DDR may be connected to the data lines 220, generate a data signal in response to a data control signal DCS of the timing controller TCON, and output the generated data signal to the data lines 220. The data driver DDR may convert digital image data DATA provided from the timing controller TCON into an analog data signal (or voltage). The data driver DDR which generates the data signal may supply the data signal to the data lines 220 to be synchronized with the scan signal.

The timing controller TCON may receive image data DATA, synchronization signals Vsync and Hsync and a clock signal CLK, which are used to control the display thereof, and the like. The timing controller TCON may correct the received image data DATA to be suitable for image display on the display panel 200, and output the corrected image data DATA to the data driver DDR. Also, the timing controller TCON may generate driving control signals SCS and DCS for control driving of the scan driver SCR and the data driver DDR, based on the synchronization signals Vsync and Hsync and the clock signal CLK.

The pixels PX are selected in units of horizontal lines, corresponding to the scan signals S1, S2, . . . , and Sn supplied to the scan lines 210. Each of the pixels PX selected by the scan signals S1, S2, . . . , Sn may be supplied with a data signal from any one of the data lines 220 connected thereto. Each of the pixels PX supplied with the data signal may generate light with a predetermined luminance corresponding to the data signal.

In an embodiments, the scan driver SCR, the data driver DDR, and/or the timing controller TCON are integrated into one integrated circuit to form a display IC D-IC, but the present disclosure is not limited thereto. Also, in some embodiments, at least one of the scan driver SCR, the data driver DDR, and the timing controller TCON may be integrated or mounted on the display panel 200.

Referring to FIGS. 3B and 3C, the display panel 200 includes a plurality of pixels PX. Each pixel PX may include an emission area EMA and a non-emission area NEM. That is, the display area 201 may include the emission area EMA overlapping with a light emitting element LD in a third direction (or Z direction) as a thickness direction, and the non-emission area NEM as an area except the emission area EMA.

The pixel PX may include a first color pixel, a second color pixel, and a third color pixel. The color pixels PX may be arranged in various manners. In an embodiment, the first color pixels (e.g., red pixels) and the second color pixels (e.g., blue pixels) may be alternately arranged while forming a first row along the first direction (X direction), and the third color pixels (e.g., green pixels) may be arranged along the first direction (X direction) on a second row adjacent to the first row. The color pixels belonging to the second row may be disposed to be misaligned with the color pixels belonging to the first row in the first direction (X direction). A number of the third color pixels belonging to the second row may be two times of that of the first color pixels or the second color pixels, which belong to the first row. The arrangement of the first row and the second row may be repeated along the first direction (X direction).

Sizes of emission areas EMA in the respective color pixels PX may be different from each other. For example, an emission area EMA_B of the second color pixel may be greater than that of an emission area EMA_R of the first color pixel, and an emission area EMA_G of the third color pixel may be smaller than that of the emission area EMA_R of the first color pixel.

The shape of the emission area EMA of each color pixel PX may be roughly an octagonal shape. However, the present disclosure is not limited thereto, and the shape of each emission area EMA may be a circular shape, a rhombic shape, another polygonal shape, a polygonal shape having round corners, or the like.

The first electrodes 120 (or touch electrodes) may be divided into mesh holes MH and a body part BP. The mesh hole MH may overlap with the emission area EMA in the thickness direction, and an area of the mesh hole MH may be greater than that of the emission area EMA. The body part BP may overlap with the non-emission area NEM in the thickness direction, and a width of the body part BP may be smaller than that of the non-emission area NEM. Through the structure described above, light output from the emission area EMA can be effectively transmitted through the first electrodes 120.

As shown in FIG. 3C, a first electrode EL1 is disposed on the base substrate BSL for each pixel PX. A pixel defining layer PDL exposing the first electrode EL1 may be disposed over the first electrode ELL The pixel defining layer PDL is disposed in the non-emission area NEM.

An emitting layer EML may be disposed on the first electrode EL1 exposing the pixel defining layer PDL, and a second electrode EL2 may be disposed on the emitting layer EML. The second electrode EL2 may be entirely disposed without distinguishing the pixels from each other. The first electrode EL1, the emitting layer EML, and the second electrode EL2 constitute each light emitting element LD.

The thin film encapsulation layer TFE including a first inorganic layer IOL1, an organic layer OL, and a second inorganic layer IOL2 may be disposed on the top of the second electrode EL2. The first electrodes 120 and a second insulating layer IL2 may be sequentially disposed on the thin film encapsulation layer TFE. The first inorganic layer IOL1 and the second inorganic layer IOL2 may protect the element layer DSL from moisture and oxygen, and the organic layer OL may protect the element layer DSL from foreign matters such as dust particles.

The body part BP may be disposed while overlapping with the pixel defining layer PDL, and be located in the non-emission area NEM. That is, since the body part BP does not overlap with the emission area EMA, the body part BP should not disturb light emission.

Figure 4:
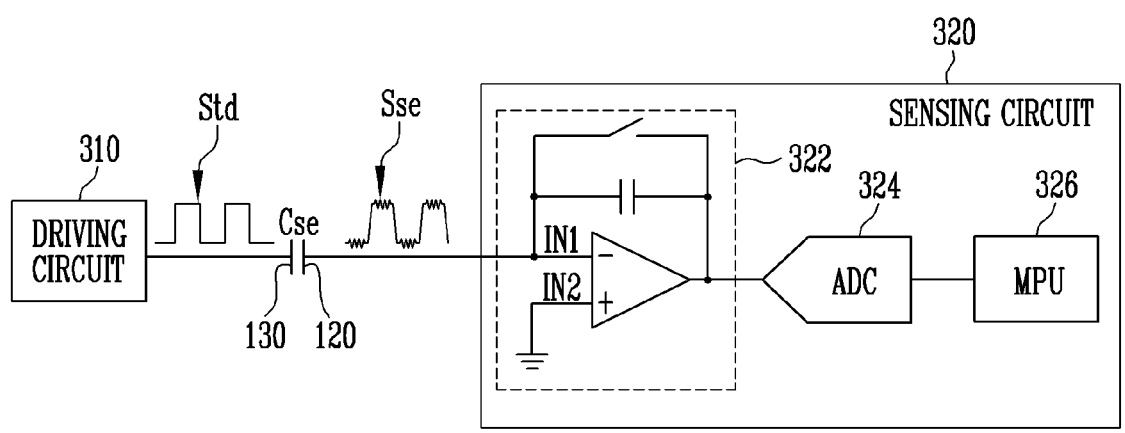
FIG. 4 is a diagram illustrating a method of driving the touch sensor in accordance with an embodiment of the present disclosure.

FIG. 4 is a diagram illustrating a method of driving the touch sensor in accordance with an embodiment of the present disclosure. For convenience, a capacitance Cse formed at an intersection portion of one first electrode 120 and one second electrode 130 is equivalently illustrated in FIG. 4, and a method of detecting a touch input by using the capacitance Cse will be described.

Referring to FIG. 4, a capacitance Cse is formed at an intersection portion of a first electrode 120 and a second electrode 130. The second electrode 130 is supplied with a touch driving signal Std from a driving circuit 310 provided in the touch driver 300. Then, a touch sensing signal Sse corresponding to the touch driving signal Std is output from the first electrode 120 due to a coupling effect of the capacitance Cse. The touch sensing signal Sse is input to a sensing circuit 320 provided in the touch driver 300. The sensing circuit 320 amplifies, converts, and signal-processes a touch sensing signal Sse input from each first electrode 120, and detects a touch input, based on a result obtained by the amplifying, the converting, and the signal processing of the touch sensing signal Sse.

In an embodiment, the sensing circuit 320 includes a signal receiver 322, an Analog Digital Converter (hereinafter, abbreviated as 'ADC') 324, and a signal processor 326.

The signal receiver 322 receives a touch sensing signal Sse from each first electrode 120. The signal receiver 322 may amplify the touch sensing signal Sse and output an amplified version of the touch sensing signal Sse. In an example, the signal receiver 322 may be implemented as an Analog Front End (hereinafter, abbreviated as 'AFE') including at least an Operational Amplifier (OP amp). In some embodiments, a first input terminal IN1 of the signal receiver 322, e.g., an inverting input terminal of the OP amp may be electrically connected to each first electrode 120. That is, the touch sensing signal Sse from the first electrode 120 may be input to the first input terminal IN1. Meanwhile, a second input terminal IN2 of the signal receiver 322, e.g., a non-inverting input terminal of the OP amp may be electrically connected to a ground (hereinafter, abbreviated as 'GND') terminal. That is, a GND voltage may be input to the second input terminal IN2.

The ADC 324 converts an analog signal input from the signal receiver 322 into a digital signal. In some embodiments, the ADC 324 may be provided as many as the number of first electrodes 120 so as to correspond one-to-one to sensing channels corresponding to the respective first electrodes 120. For example, if there are N sensing channels, then there would be N ADCs 324, where N is an integer of 1 or more. Alternatively, in another embodiment, the ADC 324 may be configured such that a plurality of first electrodes 120 share one ADC 324. A switching circuit may be additionally provided between ADCs 324 of the signal receiver 322.

The signal processor 326 signal-processes the converted signal (digital signal) from the ADC 324, and detects a touch input, based on a result obtained by the signal-processing of the converted signal. In an example, the signal processor 326 may detect whether a touch input has occurred and a position of the touch input by synthetically analyzing a signal input via the signal receiver 322 and the ADC 324 from a plurality of first electrodes 120 (i.e., an amplified and converted touch sensing signal Sse). In some embodiments, the signal processor 326 may be implemented as a microprocessor (hereinafter, abbreviated as 'MPU'). A memory used for driving of the signal processor 325 may be additionally provided in the sensing circuit 320. However, the configuration of the signal processor 326 is not limited thereto. In another example, the signal processor 326 may be implemented as a microcontroller (MCU) or the like.

As described above, the touch sensor may be coupled to the display panel 200 or the like. In an example, the sensor unit 100 may be integrally manufactured with the display panel 200, or be attached to at least one side of the display panel 100 after the sensor unit 100 is manufactured separately from the display panel 200.

When the sensor unit 100 is coupled to the display panel 200 as described above, a parasitic capacitance may occur between the sensor unit 100 and the display panel 200. Noise from the display panel 200 may be transferred to the touch sensor, i.e., the sensor unit 100 due to a coupling effect of the parasitic capacitance, etc. The noise introduced to the touch sensor may cause ripples in the touch sensing signal Sse, and therefore, the sensitivity of the touch sensor may deteriorate.

In accordance with an embodiment of the present disclosure, the sensor unit 100 operates in a normal sensing mode in which a surface touch is recognized or a proximity sensing mode in which a hovering touch is recognized. A touch recognized when an indicator such as a finger or a touch pen is in contact with a surface of the touch active area 101 may be defined as the surface touch, and a touch recognized when an indicator such as a finger or a touch pen comes close to the touch active area 101 may be defined as the hovering touch.

As described above, the sensor unit 100 may recognize a surface touch in the normal sensing mode or recognize a hovering touch in the proximity sensing mode, by using a mutual capacitance method. In an embodiment, the touch driver 300 sets a swing width (or a magnitude of an amplitude) of a touch driving signal Std (or driving pulse) supplied in the proximity sensing mode to be greater than that of a touch driving signal Std supplied in the normal sensing mode. For example, the touch driver 300 may supply a touch driving signal Std having a swing width of 6 [V] in the normal sensing mode to the sensor unit 100 (or the second electrode 130), and supply a touch driving signal Std having a swing width of 12 [V] in the proximity sensing mode to the sensor unit 100 (or the second electrode 130). However, the method of recognizing a touch in the normal sensing mode and the proximity sensing mode is not limited to the mutual capacitance method. For example, various touch recognition methods such as a self-capacitance method may be used.

Figure 5:
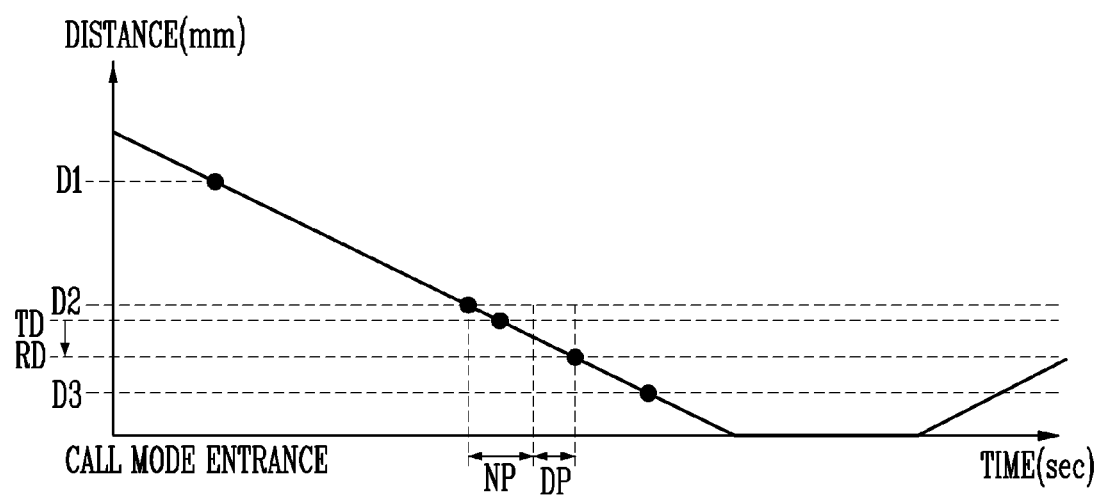
FIG. 5 is a diagram illustrating a reason why noise is generated when a call mode is activated while the display device is operating in a proximity sensing mode.
Figure 6:
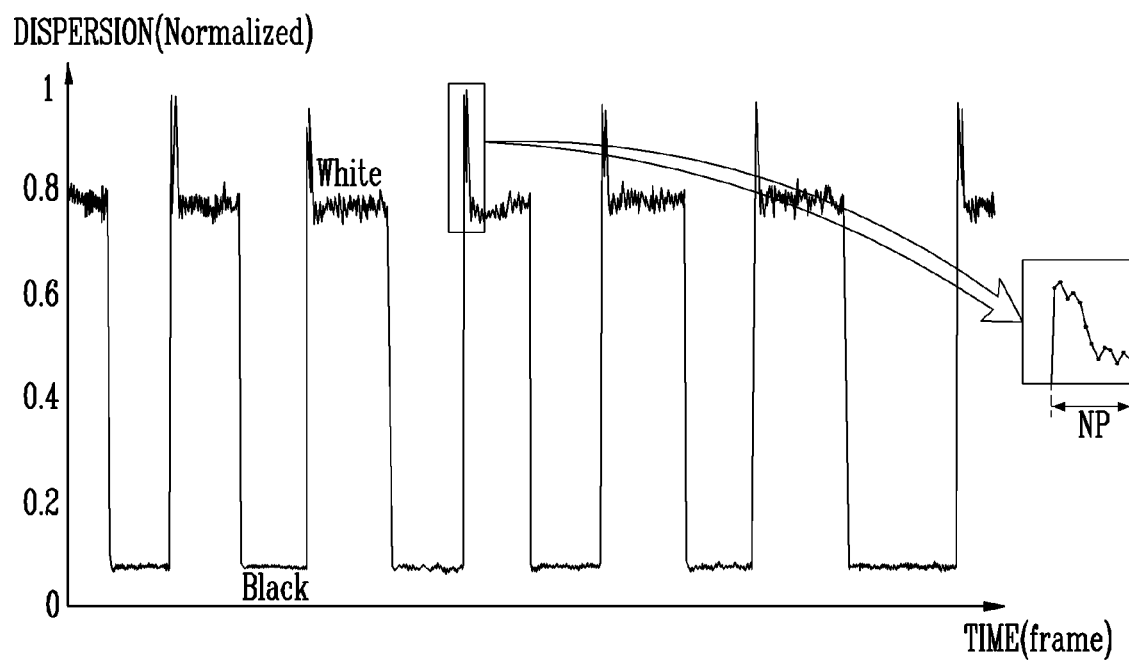
FIG. 6 is a graph illustrating parasitic capacitance between the sensor unit and the display panel, which is normalized according to time to describe a noise period.

FIG. 5 is a diagram illustrating a reason why noise is generated when a call mode is activated while the display device is operating in the proximity sensing mode. FIG. 6 is a graph illustrating an exemplary parasitic capacitance between the sensor unit and the display panel, which is normalized according to time to describe a noise period.

Referring to FIGS. 1A, 5, and 6, as described above in FIG. 1A, the display device 1000 in accordance with the embodiment of the present disclosure may be implemented as a portable terminal. When the display device 1000 enters a call mode in which a call application is executed, the display device 1000 may change the mode of the sensor unit 100 from the normal sensing mode to the proximity sensing mode. For example, the call mode may occur when the display device 1000 is located within a portable terminal (e.g., a smartphone), a remote user telephones the portable terminal to engage in a call, and a local user enters an input into the portable terminal to accept the call. In another example, the call mode may occur when the display device 1000 is located within a portable terminal and a local user enters an input into the portable terminal to engage in a call with an external user. When a part of the body (e.g., an ear or face) of a user comes close to the display panel 100 at a predetermined distance (or a target recognition distance TD) or less, the display device 1000 may suspend image display in the display area 201 through the proximity sensing mode. For example, the portable terminal could suspend the image display upon detecting the user is about to make physical contact with the display device 1000 during the call mode. In another example, the portable terminal could ignore a next user input other that an input to end the call upon detecting the user is about to make physical contact with the display device 1000. Thus, the display device 1000 can prevent malfunction caused by occurrence of an unwanted touch, and decrease power consumption. In some embodiments, the display device 1000 further allocates a system resource to a call function in the call mode, so that call quality can be improved.

Meanwhile, when call reception occurs while the user is executing another application (e.g., playback of a game, a moving image, or the like) other than the call application in the display device 1000, a call reception notice is not displayed in the whole of the display area 201, but a call notice may be displayed in the form of a popup window in one area (e.g., an upper end) of the display area 201. The another application being executed may be displayed in the whole of the display area 210 as it is.

When the display device 1000 enters into the call mode, the display device 1000 may change the mode of the sensor unit 100 from the normal sensing mode to the proximity sensing mode, and the sensor unit 100 may sense a hovering touch through the proximity sensing mode. Referring to FIG. 5, a first distance D1 corresponds to a step in which the display device 1000 starts coming close to the ear. When the display device 1000 reaches the target recognition distance TD, the image display in the display area 201 may be suspended. However, a variation of an image displayed in the display area 201 by the another application (e.g., playback of a game, a moving image, or the like) being executed is generated greater than a predetermined reference variation at a second distance D2 more distant from the target recognition distance TD, noise may be introduced to the sensor unit 100.

For example, noise may be generated when a frame load value of an image displayed on the display panel 200 is changed suddenly. The frame load value may correspond to grayscale values of an image frame. That is, the frame load value of an image frame may become larger as the sum of grayscale values of the corresponding image frame becomes larger. An image frame corresponding to a bright image may have a large load value, and an image frame corresponding to a dark image may have a small load value.

As shown in FIG. 6, when an image displayed on the display panel 200 is changed from a black grayscale to a white grayscale, the parasitic capacitance between the sensor unit 100 and the display panel 200 may increase rapidly. The horizontal axis of the graph represents time, and the vertical axis of the graph represents a value obtained by normalizing parasitic capacitances occurring at all intersection points of the first electrodes 120 and the second electrodes 130 of the sensor unit 100. The vertical axis of the graph may have value from 0 to 1. It can be seen that the parasitic capacitance has a value close to 1 (i.e., the noise is largest) during a certain time (i.e., a noise period NP) from a time at which the image displayed on the display panel 200 is changed from the black grayscale to the white grayscale. For example, the noise period NP may correspond to about 5 to 8 frames, when the display device 1000 is driven at a driving frequency of 20 Hz. That is, the noise period NP may correspond to a time of 250 ms to 400 ms. When the noise has a value greater than that of the touch driving signal Std (see FIG. 4) during the noise period NP, the sensor unit 100 may not perform well or malfunction during the proximity sensing mode. Consequently, the sensor unit 100 may not sense that the display device 1000 is close to a part of the body of the user. Therefore, the time at which the image display in the display area 201 is suspended may be delayed, or the image display may not be suspended at all.

Referring back to FIG. 5, when the noise period NP occurs in the target recognition distance TD, the sensor unit 100 does not recognize that the display device 1000 is close to the part of body of the user, and the time at which the image display in the display area 201 is suspended is delayed by a delay period DP. Therefore, the sensor unit 100 may recognize that the display device 1000 is close to the part of the body of the user, at a real recognition distance RD. Subsequently, the display device 1000 may suspend the image display in the display area 201 at a third distance D3.

A failure to recognize that the sensor unit 100 is close to the part of body of the user may occur even when the luminance of display panel 200 is suddenly changed due to a dimming level adjustment of the user. Hereinafter, a driving method of the display device 1000 to recognize when the sensor unit 100 is close to the part of the body even when the luminance of display panel 200 is suddenly changed will be described in detail later with reference to FIGS. 7 to 12.

Figure 7A:
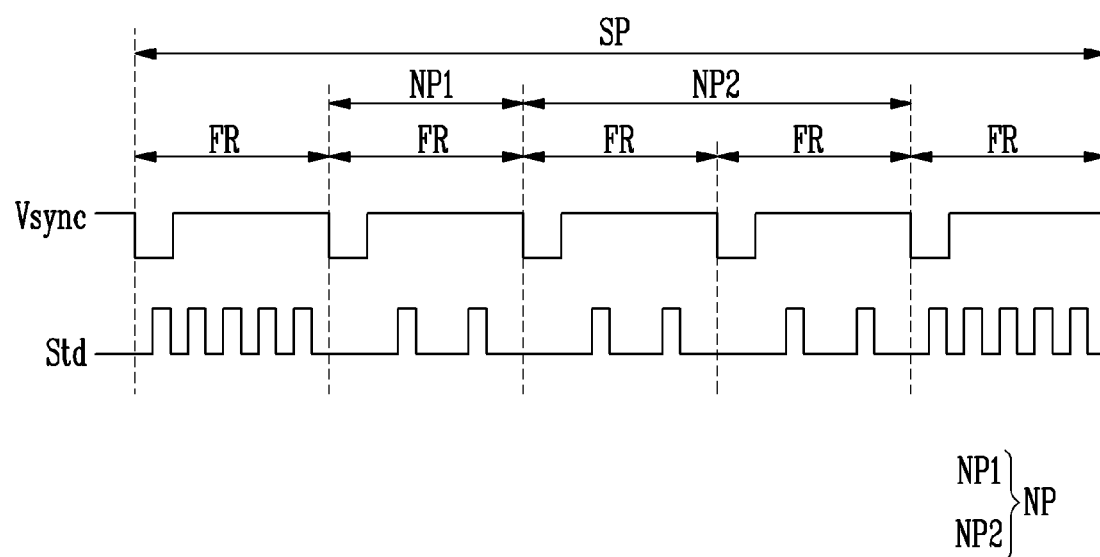
FIGS. 7A and 7B are waveform diagrams of a touch driving signal for illustrating a driving method in a sensing period in accordance with an embodiment of the present disclosure.
Figure 7B:
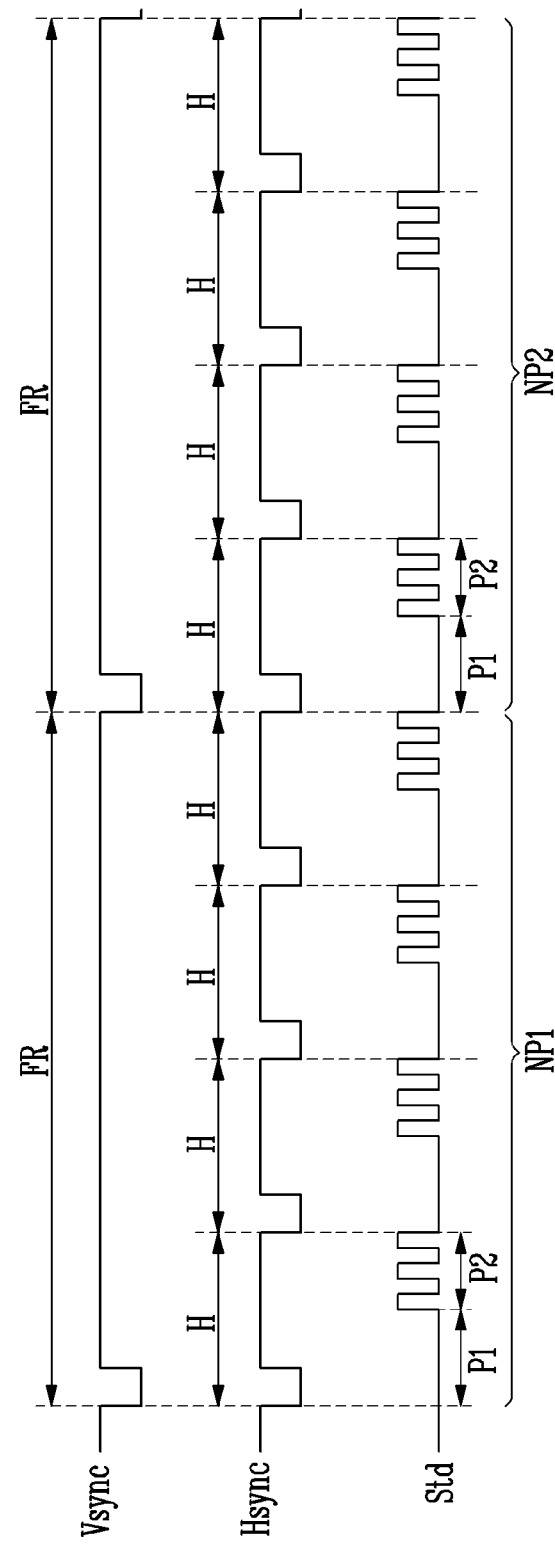

FIGS. 7A and 7B are waveform diagrams of a touch driving signal, illustrating a driving method in a sensing period in accordance with an embodiment of the present disclosure.

Referring to FIGS. 1A, 4, 7A, and 7B, the display device 1000 (or the touch driver 300) may supply a touch driving signal Std including a plurality of driving pulses to the sensor unit 100 and receive a touch sensing signal Sse from the sensor unit 100. It is assumed that, when the touch driving signal Std is supplied, the sensor unit 100 receives the touch sensing signal Sse, corresponding to the touch driving signal Std.

A vertical period may be defined by a vertical synchronization signal Vsync, and a horizontal period may be defined by a horizontal synchronization signal Hsync. Image data DATA (see FIG. 3A) of one frame may be output during the vertical period, and image data DATA of a horizontal line unit among the image data DATA of the one frame may be output during the horizontal period.

The touch driver 300 in accordance with the embodiment of the present disclosure may change the mode of the sensor unit 100 from the normal sensing mode to the proximity sensing mode, when the display device 1000 enters into the call mode. In the proximity sensing mode, when it is determined that a variation of an image being displayed in the display area 201 is greater than a predetermined reference variation, the touch driver 300 may set a noise period NP including a first noise period NP1 and a second noise period NP2 in the sensing period SP. For example, when the magnitude of parasitic capacitance between the sensor unit 100 and the display panel 200 is changed by 20% or more, the touch driver 300 may set the noise period NP in the sensing period SP.

In an embodiment, the noise period NP includes a plurality of frames FR, and the second noise period NP2 includes frames FR having a number greater than that of the first noise period NP1. The first noise period NP1 and the second noise period NP2 may be distinguished from each other, based on a predetermined noise magnitude. In other words, a noise magnitude of the first noise period NP1 may be greater than that of the second noise period NP2. In FIG. 7A, for convenience of description, it is illustrated that the noise period NP includes three frames (e.g., three frame periods), the first noise period NP1 includes one frame, and the second noise period NP2 includes two frames. However, the present disclosure is not limited thereto, and the noise period NP may be lengthened corresponding to the magnitude of parasitic capacitance occurring between the sensor unit 100 and the display panel 200. For example, the noise period NP may include 5 to 8 frames. When assuming that the noise period NP includes 8 frames, the first noise period NP1 may include 3 frames, and the second noise period NP2 may include 5 frames.

In an embodiment, the touch driver 300 decreases a number of times driving pulses of the touch driving signal Std supplied in the noise period NP are supplied, as compared with a number of times driving pulses of the touch driving signal Std supplied in the sensing period SP except the noise period NP are supplied. For example, the touch driver 300 may decrease the number of times driving pulses of the touch driving signal Std supplied in the noise period NP to be half of the number of times driving pulses of the touch driving signal Std supplied in the sensing period SP except the noise period NP are supplied.

This will be described in more detail with reference to FIG. 7B. The touch driver 300 does not supply driving pulses of the touch driving signal Std during a first period P1 (e.g., a first half period) in each of horizontal periods H of the first and second noise periods NP1 and NP2, and supplies driving pulses of the touch driving signal Std during only a second period P2 (e.g., a second half period) consecutive to the first period P1. Each of the first period P1 and the second period P2 is not limited to the period as a half of the horizontal period H. For example, in an embodiment, the second period P2 may be shorter than the first period P1. In another embodiment, the second period P2 may be longer than the first period P1.

A magnitude of noise during the first period P1 (e.g., the first half period) in one horizontal period H may be greater than that of noise during the second period (e.g., the second half period). The touch driver 300 may calculate a touch sensing signal Sse by adding up only noises during a second half period of a horizontal period in which a noise magnitude is relatively small during the first and second periods NP1 and NP2. Thus, the display device 1000 (or the sensor unit 100) can have increased recognition capability in the proximity sensing mode.

Meanwhile, in FIG. 7B, for convenience of description, it is illustrated that 4 horizontal periods H are included in one frame FR. However, the present disclosure is not limited thereto. For example, the number of horizontal periods H may correspond to the number of the scan lines 210 included in the display panel 200.

Hereinafter, other embodiments will be described. In the following embodiments, descriptions of components identical to those of the above-described embodiment will be omitted or simplified, and portions different from those of the above-described embodiment will mainly described.

Figure 8A:
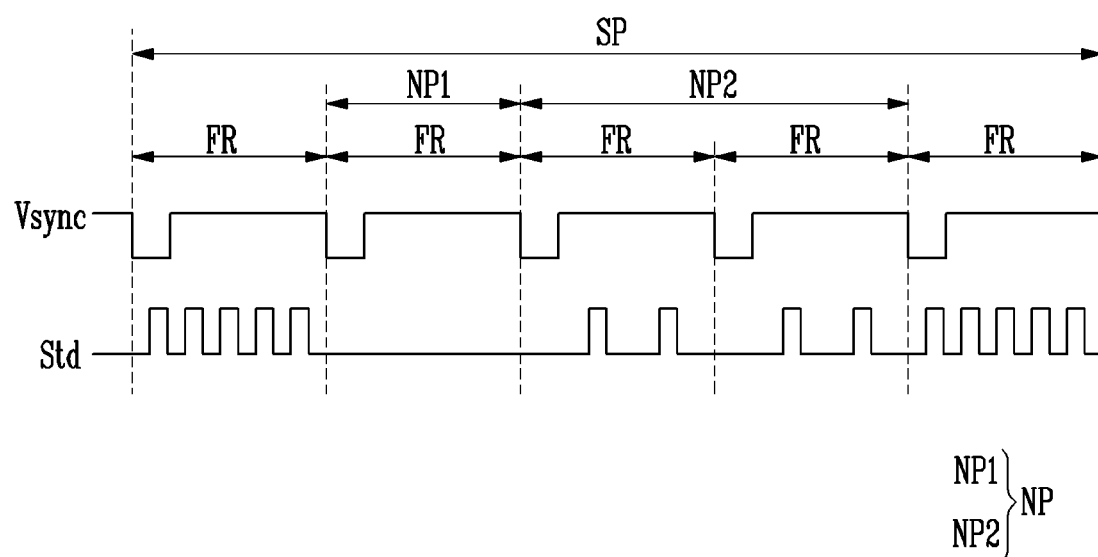
FIGS. 8A and 8B are waveform diagrams of the touch driving signal for illustrating a driving method in the sensing period in accordance with an embodiment of the present disclosure.
Figure 8B:
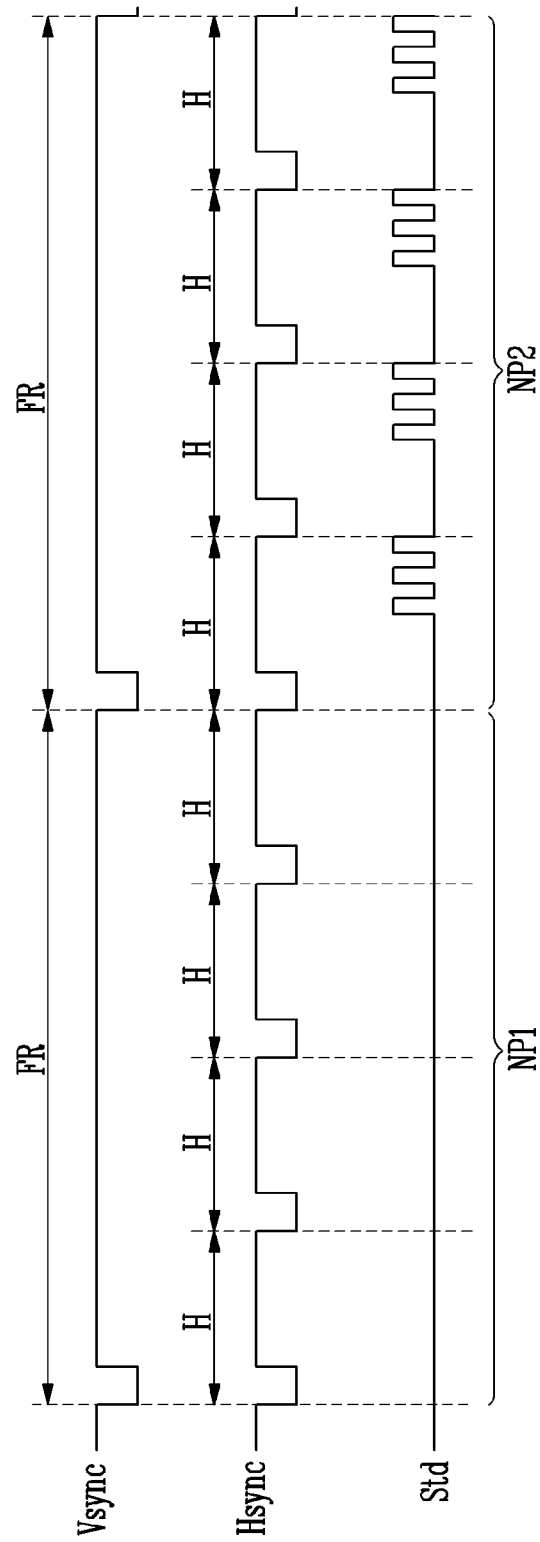

FIGS. 8A and 8B are waveform diagrams of the touch driving signal, illustrating a driving method in the sensing period in accordance with another embodiment of the present disclosure.

The embodiment shown in FIGS. 8A and 8B is different from the embodiment shown in FIGS. 7A and 7B in which the touch driving signal Std is supplied during the first noise period NP1, in that the touch driving signal Std is not supplied during the first noise period NP1.

As described above, the noise magnitude during the first noise period NP1 may be relatively greater than that during the second noise period NP1. Therefore, the sensor unit 100 does not perform the sensing operation during the first noise period NP1 having a relatively large noise magnitude, but performs the sensing operation during only the second noise period NP2 having a relatively small noise magnitude. Thus, an effect can be expected, in which the display device 1000 naturally discharges a parasitic capacitance (i.e., noise) occurring between the sensor unit 100 and the display panel 200 during the first noise period NP1. Further, since the display device 1000 does not supply the touch driving signal Std during the first noise period NP1, power consumption may be reduced.

Figure 9:
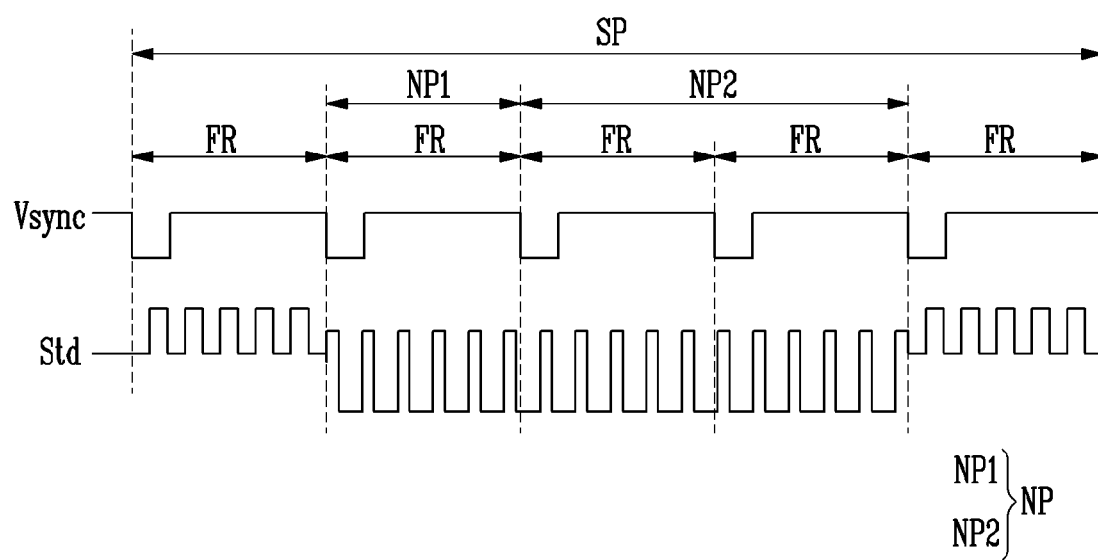
FIG. 9 is a waveform diagram of the touch driving signal for illustrating a driving method in the sensing period in accordance with an embodiment of the present disclosure.
Figure 10A:
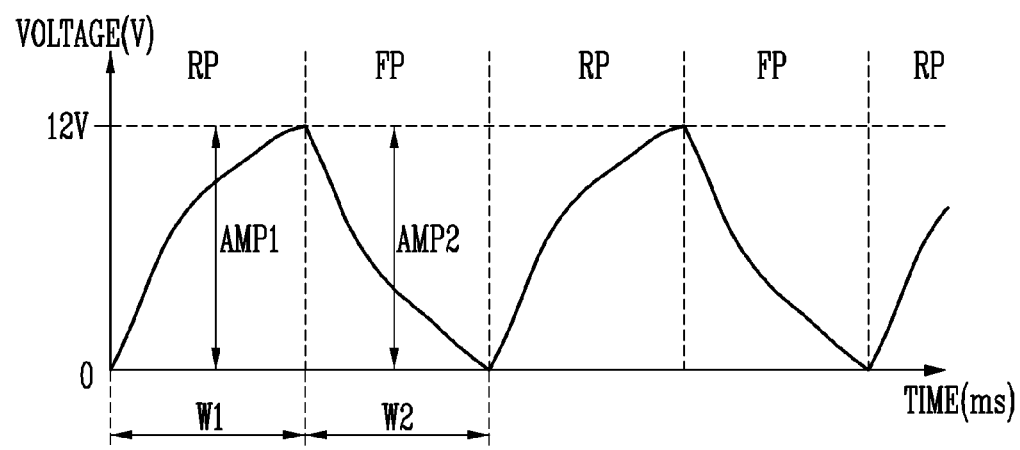
FIG. 10A is an enlarged waveform diagram of the touch driving signal during the sensing period except a noise period shown in FIG. 9.
Figure 10B:
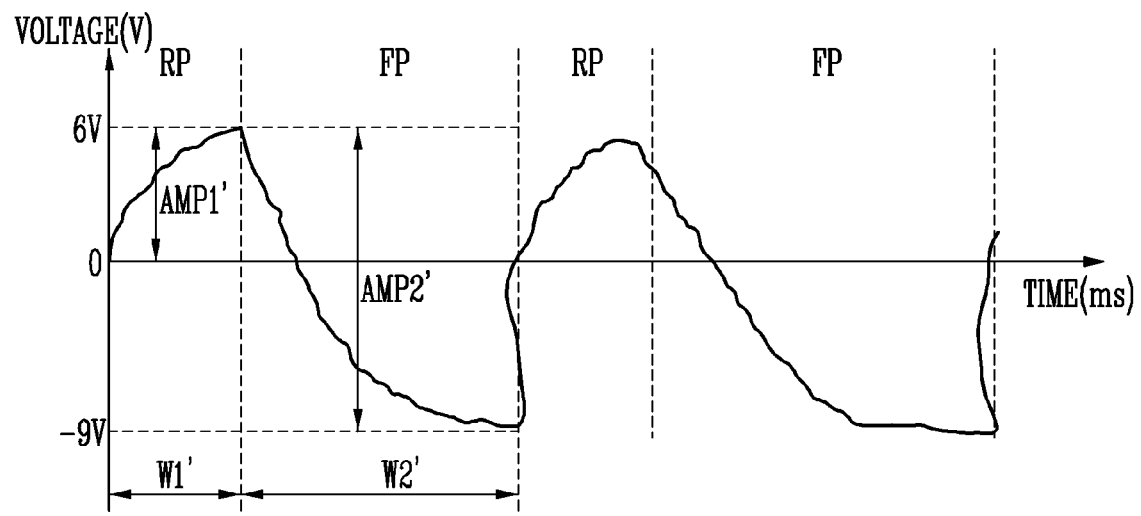
FIG. 10B is an enlarged waveform diagram of the touch driving signal during the noise period shown in FIG. 9.

FIG. 9 is a waveform diagram of the touch driving signal for illustrating a driving method in the sensing period in accordance with an embodiment of the present disclosure. FIG. 10A is an enlarged waveform diagram of the touch driving signal during the sensing period except the noise period shown in FIG. 9. FIG. 10B is an enlarged waveform diagram of the touch driving signal during the noise period shown in FIG. 9.

The embodiment shown in FIG. 9 is different from the embodiment shown in FIGS. 7A to 8B, in which the waveform of the touch driving signal Std during the noise period NP is equal to that of the touch driving signal Std during the sensing period SP except the noise period NP, in that a waveform of the touch driving signal Std during the noise period NP is different from that of the touch driving signal Std during the sensing period SP except the noise period NP.

Specifically, referring to FIGS. 1A, 4, 9, 10A, and 10B, the display device 1000 (or the touch driver 300) supplies, to the sensor unit 100, a touch driving signal Std including driving pulses including a rising period RP and a falling period FP, and receive a touch sensing signal Sse from the sensor unit 100. It is assumed that, when the touch driving signal Std is supplied, the sensor unit 100 receives the touch sensing signal Sse, corresponding to the touch driving signal Std. In an embodiment, in the sensing period SP outside of the noise period NP, the driving pulses rise from a first voltage to a second voltage larger than the first voltage and fall from the second voltage to the first voltage, and the rise and fall repeats. Further in the embodiment, during the noise period, the driving pulses rise to a third voltage between the first and second voltages and fall from the third voltage to a fourth voltage lower than the third voltage, and the rise and fall repeats. The third voltage may be lower than the first voltage.

The touch driver 300 in accordance with the embodiment of the present disclosure may change the mode of the sensor unit 100 from the normal sensing mode to the proximity sensing mode, when the display device 1000 enters into the call mode in which the call application is executed. In the proximity sensing mode, when it is determined that a variation of an image being displayed in the display area 201 is greater than a predetermined reference variation, the touch driver 300 may set a noise period NP including a first noise period NP1 and a second noise period NP2 in the sensing period SP. For example, when the magnitude of parasitic capacitance between the sensor unit 100 and the display panel 200 is changed by 20% or more, the touch driver 300 may set the noise period NP in the sensing period SP.

The noise period NP may include a plurality of frames FR, and the second noise period NP2 may include a number of frames FR having a number greater than that of the first noise period NP1. The first noise period NP1 and the second noise period NP2 may be distinguished from each other, based on a predetermined noise magnitude. In other words, a noise magnitude of the first noise period NP1 may be greater than that of the second noise period NP2. In FIG. 9, for convenience of description, it is illustrated that the noise period NP includes three frames FR, the first noise period NP1 includes one frame FR, and the second noise period NP2 includes two frames FR. However, the present disclosure is not limited thereto. For example, the noise period NP may include 5 to 8 frames FR. When assuming that the noise period NP includes 8 frames FR, the first noise period NP1 may include 3 frames FR, and the second noise period NP2 may include 5 frames FR.

The touch driver 300 may change a waveform of the touch driving signal Std during the noise period NP differently from that of the touch driving signal Std during the sensing period SP except the noise period NP. In an embodiment, the touch driver 300 sets a width and a magnitude of an amplitude (or swing width) of driving pulses of the touch driving signal Std in the noise period NP to be different from those of driving pulses of the touch driving signal Std supplied in the sensing period SP instead of the noise period NP.

This will be described in more detail with reference to FIGS. 10A and 10B. The touch driver 300 may change a ratio of a width W1 of a rising period RP of each of the driving pulses of the touch driving signal Std and a width W2 of a falling period FP of each of the driving pulses of the touch driving signal Std, and change an amplitude AMP1 of the rising period RP of each of the driving pulses and an amplitude AMP2 of the falling period FP of each of the driving pulses.

As shown in FIG. 10A, in a driving pulse of the touch driving signal Std during the sensing period SP except the noise period NP, the width W1 of the rising period RP and the width W2 of the falling period FP may be the same, and the magnitude of the amplitude AMP1 of the rising period RP and the magnitude of the amplitude AMP2 of the falling period FP may be the same. For example, in a driving pulse of the touch driving signal Std during the sensing period SP except the noise period NP, the ratio of the width W1 of the rising period RP and the width W2 of the falling period FP may be 1:1, and the magnitude of the amplitude AMP1 of the rising period RP and the magnitude of the amplitude AMP2 of the falling period FP may be the same as 12 [V].

On the other hand, as shown in FIG. 10B, in a driving pulse of the touch driving signal Std during the noise period NP, a width W2' of the falling period FP may be greater than that W1' of the rising period RP, and the magnitude of an amplitude AMP2' (or swing width) of the falling period FP may be greater than that of an amplitude AMP1' of the rising period RP. For example, in the driving pulse of the touch driving signal Std during the noise period NP, the ratio of the width W1' of the rising period RP and the width W2' of the falling period FP may be 1:2, and the magnitude of the amplitude AMP1' of the rising period RP may be 6 [V], and the magnitude of the amplitude AMP2' of the falling period FP may be 15 [V]. In other words, the touch driver 300 may set a maximum value of the amplitude AMP1' of the rising period RP to be a positive value, and set a minimum value of the amplitude AMP2' of the falling period FP to be a negative value. For example, the maximum value of the amplitude AMP1' of the rising period RP may be 6 [V], and the minimum value of the amplitude AMP2' of the falling period FP may be −9 [V].

As described above, during the noise period NP, the width W2' of the falling period FP is set greater than the that W1' of the rising period RP, and the magnitude of the amplitude AMP2' (or swing width) of the falling period FP is set greater than that of the amplitude AMP1' of the rising period RP, so that an effect substantially identical to that in which a negative DC voltage is applied to the sensor unit 100 can be expected. That is, when a negative DC voltage is applied to the sensor unit 100 during the noise period NP, an effect can be expected, in which the discharge of parasitic capacitance between the sensor unit 100 and the display panel 200 is accelerated. Accordingly, the display device 1000 (or the sensor unit 100) can have increased recognition capability in the proximity sensing mode.

Figure 11:
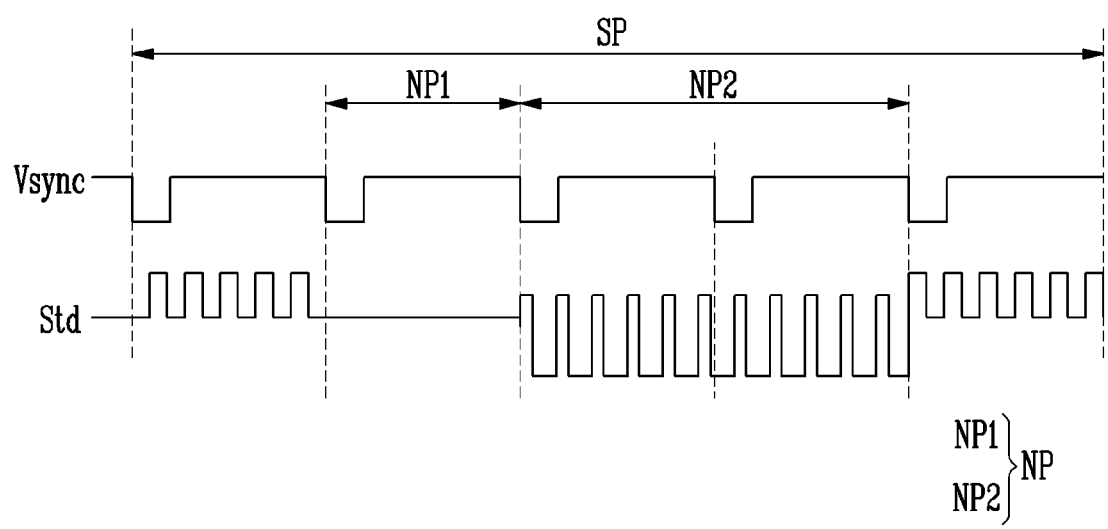
FIG. 11 is a waveform diagram of the touch driving signal for illustrating a driving method in the sensing period in accordance with another embodiment of the present disclosure.

FIG. 11 is a waveform diagram of the touch driving signal for illustrating a driving method in the sensing period in accordance with an embodiment of the present disclosure.

The embodiment shown in FIG. 11 is different from the embodiment shown in FIG. 9 in which the touch driving signal Std is supplied during the first noise period NP1, in that the touch driving signal Std is not supplied during the first noise period NP1.

The noise magnitude during the first noise period NP1 may be relatively greater than that during the second noise period NP1. Therefore, the sensor unit 100 does not perform the sensing operation during the first noise period NP1 having a relatively large noise magnitude, but performs the sensing operation during only the second noise period NP2 having a relatively small noise magnitude. Thus, an effect can be expected, in which the display device 1000 naturally discharges a parasitic capacitance (i.e., noise) occurring between the sensor unit 100 and the display panel 200 during the first noise period NP1. Further, since the display device 1000 does not supply the touch driving signal Std during the first noise period NP1, power consumption may be reduced.

Figure 12:
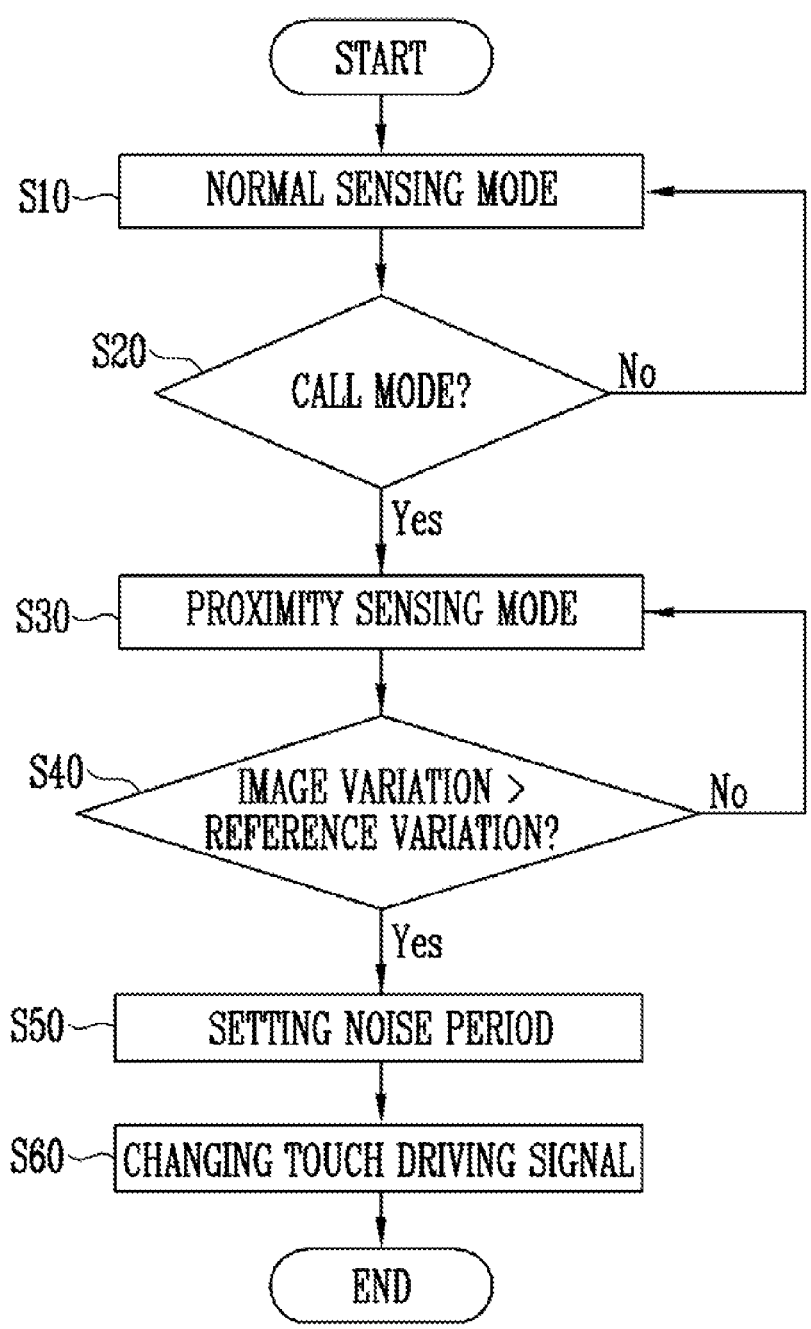
FIG. 12 is a flowchart illustrating a method of driving the display device in accordance with an embodiment of the present disclosure.

FIG. 12 is a flowchart illustrating a method of driving the display device in accordance with an embodiment of the present disclosure.

Referring to FIG. 1A to FIG. 12, the display device 1000 may include a display panel 200 which displays an image, a sensor unit 100 which operates in a normal sensing mode in which a surface touch is recognized or a proximity sensing mode in which a hovering touch is recognized, and a touch driver 300 which supplies a touch driving signal Std including a plurality of driving pulses during a sensing period SP and receives a touch sensing signal Sse from the sensor unit 100.

The display device 1000 (or the sensor unit 100) may operate in a normal sensing mode in which a surface touch is recognized or a proximity sensing mode in which a hovering touch is recognized. As shown in FIG. 12, the display device 1000 initially operates in the normal sensing mode (S10).

The display device 1000 (or the touch driver 300) determines whether the display device 1000 has entered into a call mode in which a call application is executed (S20). For example, a terminal including the display device 1000 may execute a program in the background that periodically checks to determine whether the display device 100 has entered into the call mode. When it is determined that the display device 1000 has entered into the call mode, the display device 1000 changes the touch sensing mode of the sensor unit 100 to the proximity sensing mode, and the sensor unit 100 may sense a hovering touch through the proximity sensing mode. On the contrary, when it is determined that the display device 1000 has not entered into the call mode, the display device 1000 maintains the touch sensing mode of the sensor unit 100 as the normal sensing mode.

In the proximity sensing mode, the display device 1000 (or the touch driver 300) determines whether a variation of an image displayed on the display panel 200 is greater than a predetermined reference variation (S30 and S40). The variation of the image may be defined as a luminance variation of the display panel 200 or a load value variation of image data DATA. A luminance of the display panel 200 may be changed by a dimming level adjustment of a user, or the like. In addition, a frame load value may correspond to grayscale values of an image frame. That is, the frame load value of an image frame may become larger as the sum of grayscale values of the corresponding image frame becomes larger.

For example, when an image displayed on the display panel 200 is changed from a black grayscale to a white grayscale, parasitic capacitance between the sensor unit 100 and the display panel 200 may increase suddenly. In other words, a variation of the image may correspond to the parasitic capacitance between the sensor unit 100 and the display panel 200.

When the parasitic capacitance between the sensor unit 100 and the display panel 200 is greater than a predetermined reference variation (e.g., 20%), the display device 1000 (or the touch driver 300) sets a noise period NP in the sensing period SP (S50). On the other hand, when the parasitic capacitance is not greater than the predetermined reference variation (e.g., 20%), the display device 1000 (or the touch driver 300) maintains the existing proximity sensing mode.

When the noise period NP in the sensing period SP is set, the display device 1000 (or the touch driver 300) may change a cycle and/or a waveform of the touch driving signal Std (S60).

Specifically, as described above in FIGS. 7A and 7B, the display device 1000 may decrease the number of times the touch driving signal Std is supplied during the first and second noise periods NP1 and NP2.

In addition, as described above in FIGS. 8A and 8B, the display device 1000 does not supply the touch driving signal Std during the first noise period NP1, and decreases the number of times the touch driving signal Std is supplied during the second noise period NP2.

In addition, as described above in FIGS. 9, 10A, and 10B, the display device 1000 sets the width W2' of the falling period FP of the driving pulses included in the touch driving signal Std to be greater than that W1' of the rising period RP of the driving pulses included in the touch driving signal Std, and sets the magnitude of the amplitude AMP2' of the falling period FP of the driving pulses to be greater than that of the amplitude AMP1' of the rising period RP of the driving pulses, during the first and second noise periods NP1 and NP2.

In addition, as described above in FIG. 11, the display device 1000 does not supply the touch driving signal Std during the first noise period NP1. The display device 1000 may set the width W2' of the falling period FP of the driving pulses included in the touch driving signal Std to be greater than that W1' of the rising period RP of the driving pulses included in the touch driving signal Std, and set the magnitude of the amplitude AMP2' of the falling period FP of the driving pulses to be greater than that of the amplitude AMP1' of the rising period RP of the driving pulses, during the second noise period NP2.

In an exemplary embodiment, a display device includes a display panel to display an image, a touch sensor, and a touch sensor. The touch sensor is configured to operate in a proximity sensing mode in which a hovering touch is recognized (e.g., a part of body of user or stylus brought close to surface of display is treated as a contact). The touch driver supplies a touch driving signal including a plurality of driving pulses to the touch sensor during a sensing period. The touch driver sets a noise period including a first noise period and a second noise period in the sensing period, and decreases a number of times the driving pulses are supplied during the second noise period when it is determined that a variation of the image is greater than a reference variation.

In a display device and a method of driving the same in accordance with an embodiment of the present disclosure, when a change in parasitic capacitance occurring between the touch sensor and the display panel is outside a predetermined range, a noise period is set, and a cycle and/or a waveform of a touch driving signal supplied during the noise period is changed, so that noise influence can be minimized, thereby increasing touch recognition sensitivity.

Example embodiments have been disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present disclosure as set forth in the following claims.

What is claimed is:

1. A display device comprising:
    a display panel configured to display an image, based on image data;
    a touch sensor configured to operate in one of a normal sensing mode in which a surface touch is recognized and a proximity sensing mode in which a hovering touch is recognized; and
    a touch driver configured to supply a touch driving signal including a plurality of driving pulses to the touch sensor during a sensing period, and receive a touch sensing signal from the sensor touch sensor,
    in the proximity sensing mode, the touch driver sets a noise period including a first noise period and a second noise period in the sensing period, and decreases a number of times the driving pulses are supplied during the second noise period when it is determined that a variation of the image is greater than a predetermined reference variation.

2. The display device of claim 1, wherein the touch driver does not supply the driving pulses or decreases the number of times the driving pulses are supplied, during the first noise period.

3. The display device of claim 1, further comprising a driver to output one frame of the image data during a vertical period, and output a horizontal line unit of the one frame during a horizontal period.

4. The display device of claim 3, wherein the noise period comprises a plurality of frame periods, and the second noise period is longer than the first noise period.

5. The display device of claim 3, wherein, in each of horizontal periods of the second noise period, the touch driver does not supply the driving pulses during a first period, but supplies the driving pulses during a second period consecutive to the first period.

6. The display device of claim 5, wherein, in each of horizontal periods of the first noise period, the touch driver does not supply the driving pulses during a third period, but supplies the driving pulses during a fourth period consecutive to the third period.

7. The display device of claim 1, wherein a mode of the touch sensor is changed from the normal sensing mode to the proximity sensing mode, when the display device enters into a call mode in which a call application is executed.

8. The display device of claim 7, wherein, in the call mode, the touch driver turns off the display panel through the proximity sensing mode, when it is determined that the display panel is within a predetermined distance of a part of a body of a user.

9. The display device of claim 1, wherein the variation of the image is determined from a luminance variation of the display panel or a load value variation of the image data.

10. The display device of claim 9, wherein the touch driver determines whether a variation of capacitance occurring between the display panel and the touch sensor is greater than the reference variation by comparing the variation of capacitance occurring between the display panel and the touch sensor with the reference variation, corresponding to the luminance variation or the load value variation.

11. A method of driving a display device including a display panel for displaying an image, a touch sensor configured to operate in one of a normal sensing mode in which a surface touch is recognized and a proximity sensing mode in which a hovering touch is recognized, and a touch driver for supplying a touch driving signal including a plurality of driving pulses to the touch sensor unit during a sensing period, the method comprising:

determining whether the display device has entered into a call mode in which a call application is executed;

changing a mode of the touch sensor from the normal sensing mode to the proximity sensing mode, when the display device enters into the call mode;

in the proximity sensing mode, determining whether a variation of the image is greater than a predetermined reference variation;

setting a noise period including a first noise period and a second noise period in the sensing period, when the variation of the image is greater than the predetermined reference variation; and decreasing, by the touch driver, a number of times the touch driving signal is supplied during the second noise period.

12. The method of claim 11, future comprising the touch driver not supplying the driving pulses or decreasing a number of times the driving pulses are supplied, during the first noise period in the proximity sensing mode.

13. The method of claim 11, wherein the variation of the image is determined from a luminance variation of the display panel or a load value variation of image data of the image.

14. The method of claim 13, wherein the determining of whether the variation of the image is greater than the predetermined reference variation comprises determining whether a variation of capacitance occurring between the display panel and the touch sensor is greater than the reference variation by comparing the variation of capacitance occurring between the display panel and the touch sensor with the reference variation, corresponding to the luminance variation or the load value variation.

* * * * *